United States Patent
Brannen et al.

(10) Patent No.: US 6,808,147 B2
(45) Date of Patent: Oct. 26, 2004

(54) CLAMPING DEVICE FOR STAINLESS STEEL SINKS

(76) Inventors: Russell H. Brannen, PMB #202, 2500 Dallas Hwy., Suite 202, Marietta, GA (US) 30064; Carl R. Brucker, PMB #202, 2500 Dallas Hwy., Suite 202, Marietta, GA (US) 30064

( * ) Notice: Subject to any disclaimer, the term of this patent is extended or adjusted under 35 U.S.C. 154(b) by 0 days.

(21) Appl. No.: 10/354,578

(22) Filed: Jan. 30, 2003

(65) Prior Publication Data

US 2004/0149870 A1 Aug. 5, 2004

(51) Int. Cl.$^7$ ............................................. F21V 35/00
(52) U.S. Cl. ............................ 248/213.2; 248/224.7; 248/231.61; 248/316.1
(58) Field of Search ................... 248/213.2, 214, 248/215, 224.7, 229.14, 229.24, 228.5, 231.61, 304, 316.1, 316.6, 220.22, 210, 211, 222.14, 77

(56) References Cited

U.S. PATENT DOCUMENTS

| | | | | |
|---|---|---|---|---|
| 1,455,221 A | * | 5/1923 | Myers | 248/210 |
| 2,461,256 A | * | 2/1949 | Black | 440/109 |
| 2,529,285 A | * | 11/1950 | Felton | 248/229.14 |
| 2,634,928 A | * | 4/1953 | Hawes | 248/514 |
| 3,260,486 A | * | 7/1966 | Groff | 248/539 |
| 3,904,041 A | * | 9/1975 | Medgebow | 211/72 |
| 4,025,016 A | * | 5/1977 | Brothers | 248/210 |
| 4,222,541 A | * | 9/1980 | Cillis | 248/210 |
| 4,685,646 A | * | 8/1987 | Harrison | 248/231.61 |
| 4,760,986 A | * | 8/1988 | Harrison | 248/231.61 |
| 4,907,772 A | * | 3/1990 | Willinger | 248/231.71 |
| 5,312,077 A | * | 5/1994 | Gutierrez | 248/214 |
| 5,560,576 A | * | 10/1996 | Cargill | 248/231.61 |
| 6,109,460 A | * | 8/2000 | Herlevi et al. | 211/85.13 |
| 6,256,844 B1 | * | 7/2001 | Wheatley | 24/265 CD |

* cited by examiner

Primary Examiner—Anita King
Assistant Examiner—Naschica S. Morrison
(74) Attorney, Agent, or Firm—Marvin L. Moore

(57) ABSTRACT

A clamping device for stainless steel sinks having rolled rim edges used for suspension of weighted items from the sink's rolled rim edge for better organization around the sink work area, comprising a facial plate having a front and a crispate top connecting the front to a back. The front has a pair of slots disposed substantially near the bottom on opposite sides and extend upward vertically there from. Inserted between the front and back is a compression gib. The compression gib has a pair of grooves which align with the slots in the facial plate. A supporting member having two arms connected at one end by a cross member and opposite thereto a pair of threaded ends fays the device together and to the sink. The vertical slots in the front facial plate and the grooves in the compression gib align to receive the threaded ends. Fastening means and washers are affixed onto the threaded ends of the supporting member. A bracing member is affixed to the terminal end of each threaded end of the supporting member. The various components of the present invention, and the manner in which they interrelate, will be described in greater detail hereinafter.

11 Claims, 7 Drawing Sheets

CLAMPING DEVICE FOR STAINLESS STEEL SINKS

CROSS REFERENCE TO RELATED APPLICATIONS

There are no applications related to this application filed in this or any foreign country.

FEDERALLY SPONSORED RESEARCH

Not Applicable

SEQUENCE LISTING OR PROGRAM

Not Applicable

FIELD OF THE INVENTION

The present invention relates generally to a clamping device and more specifically a clamping device for stainless steel sinks having a rolled rim edge.

BACKGROUND OF THE INVENTION

Keeping America's food supply free from bacteria contamination has been and will always be of utmost priority. Consumer confidence is of vital importance to food service businesses. Serving spoiled food to the general public and running a dirty facility destroys consumer confidence and can cause business failure. Regulatory agencies routinely inspect and grade food service businesses for assurance that proper procedures are being followed to protect the food supply. Laws and penalties are in place to enforce compliance. Business operators have to continually seek assurances that their employees are trained properly and that the right programs and procedures are in place to effectively prevent and control the growth of bacteria, maintain a clean and impressive facility, and assure that regulatory compliance is always achieved.

Food Service businesses commonly have one or more stainless steel sinks. These sinks are usually freestanding with an open area underneath. They may comprise one or more compartments dependent upon the design and the user needs. A 3-compartment sink is the more common of the designs. These sinks commonly have a working surface with a rolled rim edge along the front and sides which minimize midsection discomfort when bending over the working surface to wash, rinse, and sanitize cooking equipment used during food preparation.

All food preparation items must be routinely washed, rinsed, and sanitized after each use. Regulatory agencies require a three-step process of washing, rinsing, and sanitizing all food contact surfaces, followed by an air-drying process; thus, illustrating the importance of the compartmentalized sinks. Employees wash the items in one compartment, rinse the items in a second compartment, and sanitize the items in a third compartment. Because the workload at the sink area is intense and very repetitious, there is always a plurality of cooking equipment, detergents, sanitizers, and other items in and around the sink area. Historically, wall-mounted racks have been a means for organizing such items. However, wall-mounted racks require holes that create potential portals of entry for insects and rodents and aesthetically damage the walls. Since adequate space is a premium in most food preparation areas, particularly around the sink area, a means for organizing cleaning chemicals, cleaning tools, and other ancillary food service equipment would be beneficial to food service establishments.

Employee safety is also a primary concern in food preparation areas. The floors are especially important to safety since a greasy floor can cause a slip and fall, and thus result in possible injury and liability issues for the business operators. The floor cleaning process is usually performed with a food grade water hose attached to a hose bib outlet, in conjunction with a mopping arrangement. Quite often, the hose is stored under the sink on the floor, or in some instances, a wall-mounted hose hanger is used, attached to a wall stud with either screws or bolts. Regulatory agencies quite often deduct points for hoses left openly exposed on the floor, as it is a cleaning hindrance and a walking safety hazard.

Chemical manufacturers maintain a marketing focus in the food service industry. Numerous manufacturers provide an array of cleaning products, along with employee training tools and chemical dispensing equipment to control the consumption rate of the products. Chemical manufacturers package their chemicals utilizing different concepts. Gallon containers, five-gallon pails, and polypropylene bags are the most common types of packaging used. The chemicals are stored on the floor under the sinks, on the drain board of the sinks, in racks mounted to the walls near the sinks, or in freestanding racks around and under the sinks.

Therefore, there remains a need in the food service industry for a versatile device which will aid in safely organizing and making readily accessible items used while working at and around the sink area.

SUMMARY OF THE INVENTION

It is therefore an object of the present invention to provide a clamping device for stainless steel sinks which aids in safely organizing and making readily accessible items used while working at and around the sink area.

It is another object of the present invention to provide a clamping device for stainless steel sinks which eliminates the need for freestanding storage racks which impede the cleaning of floors.

It is another object of the present invention to provide a clamping device for stainless steel sinks which eliminates the need to drill holes in walls or sinks when mounting dispensing equipment.

It is a further object of this invention to provide a clamping device for stainless steel sinks which is mounted to the rolled rim by utilizing four points of contact.

An even further object of the present invention is to provide a clamping device for stainless steel sinks which when mounted can be slid along the edge of the rolled rim working surface.

The present invention provides a clamping device for stainless steel sinks having rolled rim edges. The device comprises a facial plate having a front and a crispate top connecting the front to a back. The front has a pair of elongated slots disposed substantially near the bottom of the front on opposite sides and extend upward vertically there from. The front facial plate has a greater linear extension than the back facial plate. Inserted between the front and back is a compression gib of substantial thickness. The compression gib has a pair of grooves which align with the slots in the facial plate. The top of the compression gib has a crispate shape which allows it to fit firmly beneath the rolled rim of a stainless steel sink when in operation. A supporting member having two arms connected at one end by a cross member and opposite thereto a pair of threaded ends is used to fay the device together and to the sink. The threaded ends are received by the vertical slots in the front facial plate and the grooves of the compression gib. Fastening means and washers are affixed to the threaded ends of the supporting member to assist in securing the clamping device to the sink. A bracing member is affixed to the terminal end of each threaded end of the supporting member.

Other aspects, objects, features and advantages of the present invention will become apparent to those skilled in the art upon reading the detail description of preferred embodiments in conjunction with the accompanying and appended claims.

DESCRIPTION OF THE DRAWINGS

In the drawings, which are discussed below, the same reference numerals refer to the same features of the invention throughout the drawings. A clamping device for stainless steel sinks according to the preferred embodiment of the invention is shown in FIGS. 1–9.

DETAILED DESCRIPTION OF THE INVENTION

While the specification concludes with claims particularly pointing out and distinctly darning the subject matter which is regarded as the invention, the invention will now be described by reference to the following description of preferred embodiments taken in conjunction with the accompanying drawings.

Figure 2:
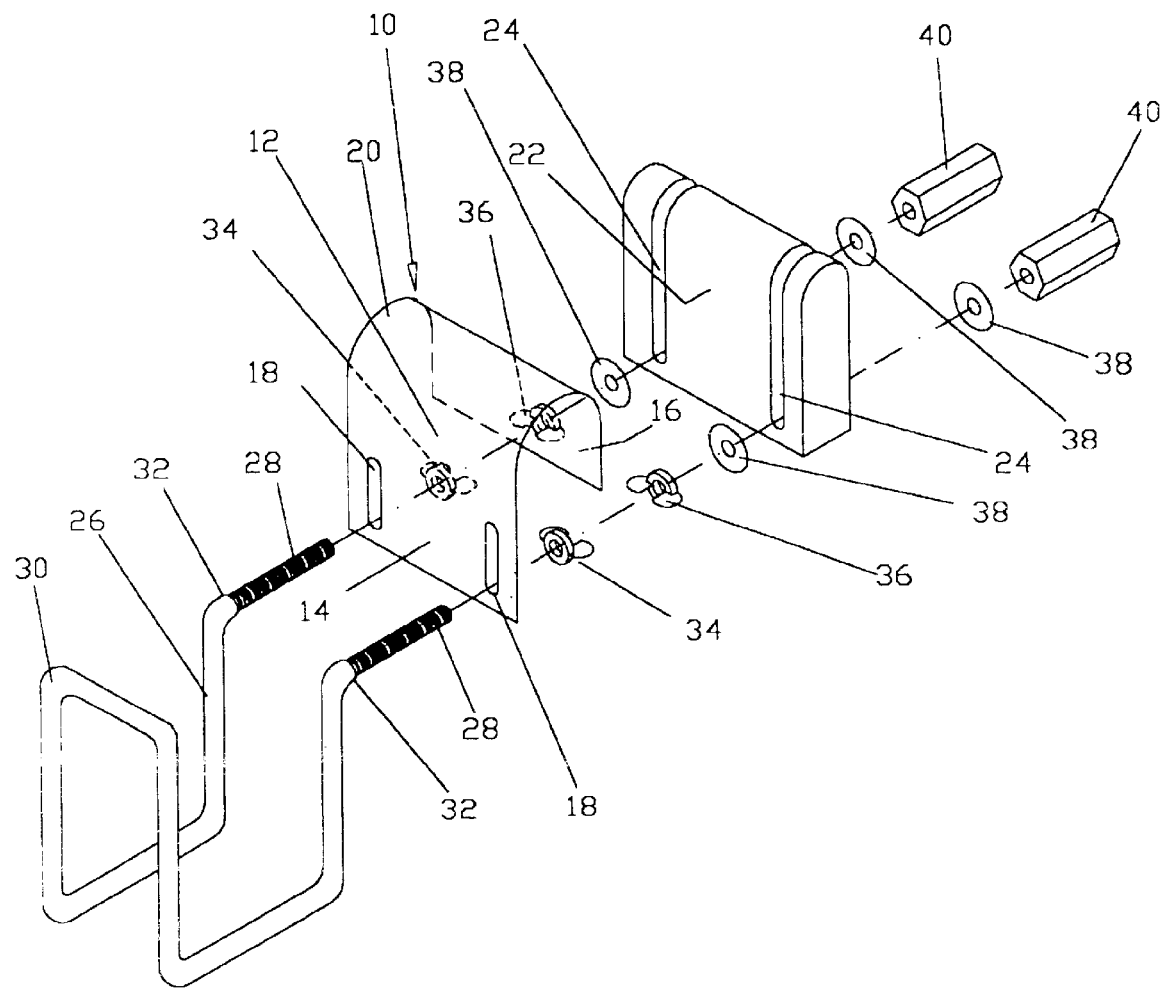
FIG. 2 represents an isometric view of the clamping device for stainless steel sinks unassembled and showing an alternative supporting member.

Referring now to the drawings, and particularly FIG. 2, there is shown an isometric view of a clamping device for stainless steel sinks generally designated by the reference numeral 10 constructed according to the principles of the present invention. The present device, in its broadest context, has as its components a facial plate 12, a compression gib 22, a supporting member 26, fastening means 34, 36, washers 38, and bracing members 40.

Figure 3:
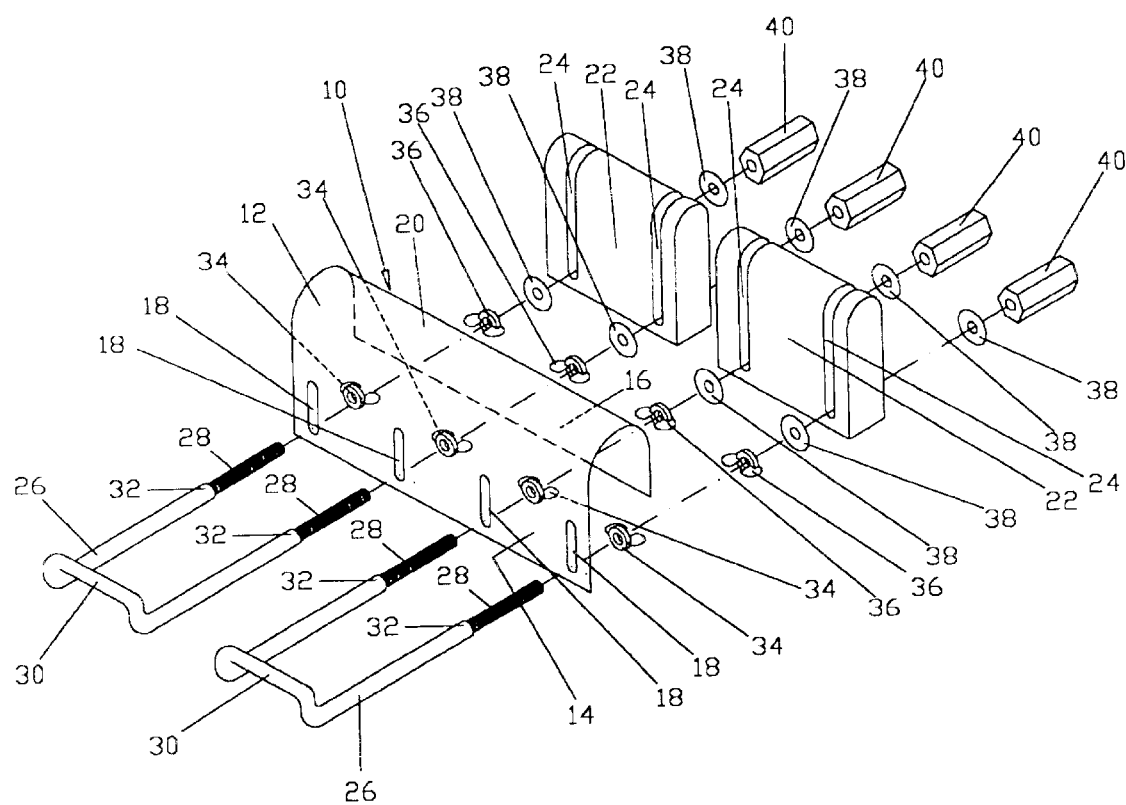
FIG. 3 represents an isometric view of the clamping device for stainless steel sinks unassembled and showing a facial plate with an extended width.
Figure 7:
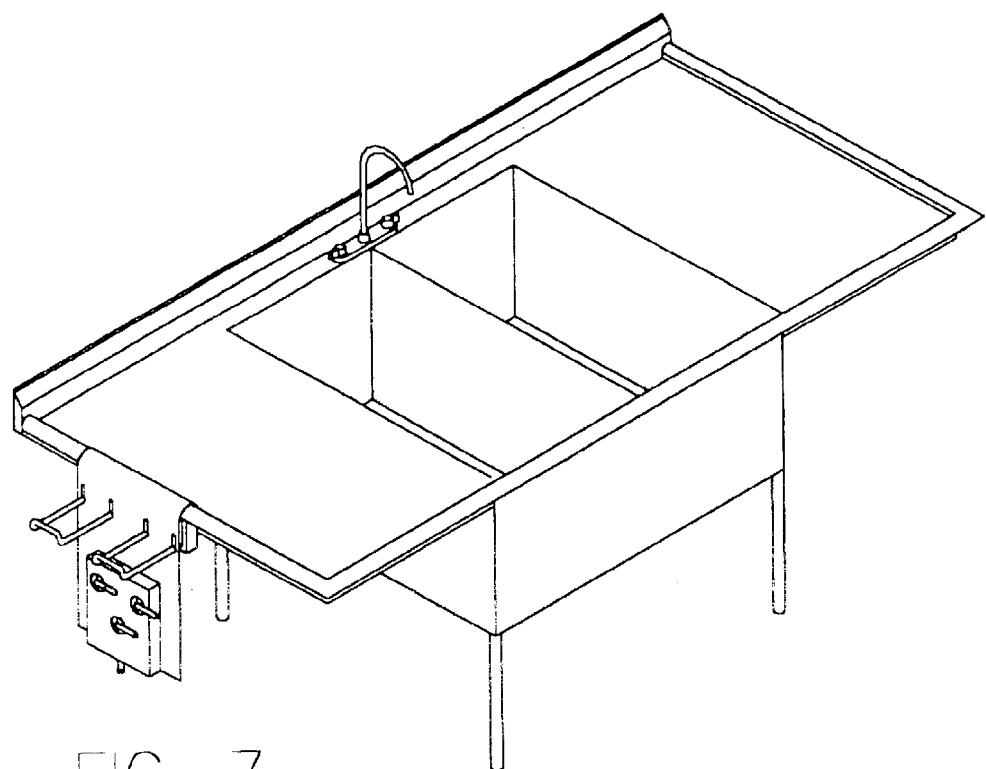
FIG. 7 represents a perspective view of the clamping device of FIG. 3 having an extended front facial plate with dispensing equipment attached in combination with a rolled rim stainless steel sink.

The facial plate 12 is further defined by a front 14, and crispate top 20, which connects the front 14 to a back 16. The front 14 has a greater linear extension than the back 16. In one embodiment, the front 14 can be extended so as to form a mounting surface for chemical dispensing equipment as in FIG. 7. The front 14 also has a pair of elongated slots 18 which are disposed substantially near the bottom of the front 14 on opposite sides and extend upward vertically there from. An additional feature of the facial plate 12 is that the width can be extended to accommodate numerous pairs of elongated vertical slots 18, as depicted in FIG. 3. The width of the facial plate 12 is limited only by the size of the sink or the user's desired purpose for the device 10. Furthermore, the facial plate 12 can be modified in shape and size to accommodate different sink designs. Preferably the facial plate 12 is molded or shaped from a single sheet of stainless steel, which provides the perfect medium for sterilization. However, any appropriate material of suitable strength can be used.

Figure 4:
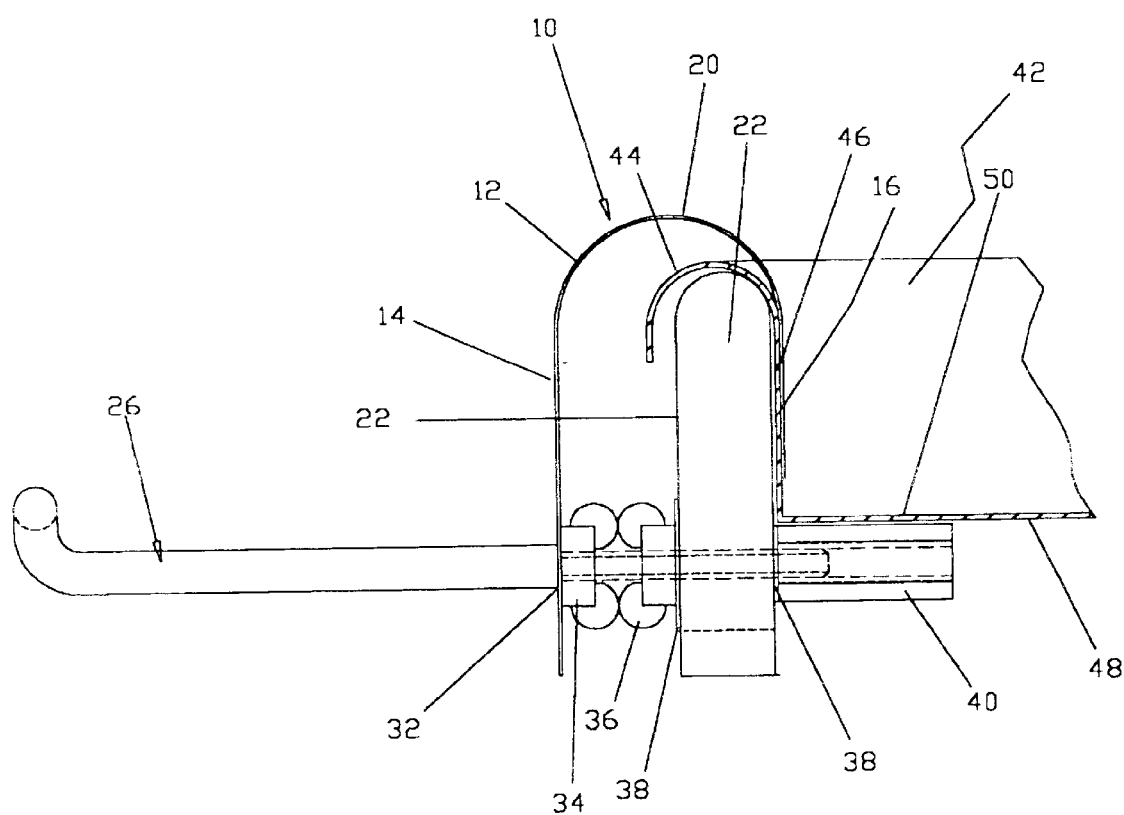
FIG. 4 represents a side view of the clamping device of FIG. 1 in combination with a rolled rim sink with portions cut away to illustrate the device in operation.

Compression gib 22 is constructed of a hard material and has substantial thickness to achieve its designed purpose. The gib 22 like the facial plate 12 has a crispate top. However, as seen in FIG. 4, the crispate top of the gib 22 is shaped to fit the contours of the underside of the rolled rim edge 44. A pair of grooves 24, as seen in FIG. 2, are disposed perpendicularly to the gib's 22 crispate top and extend downward to substantially near the bottom so as to align with the slots 18 of the facial plate 12. Preferably a single gib 22 is used for each pair of slots 18 in the facial plate 12. The gib 22 functions as a bearing surface for securing the device 10 in position. The manner in which these components and others interrelate will be described in greater detail hereinafter.

Figure 1:
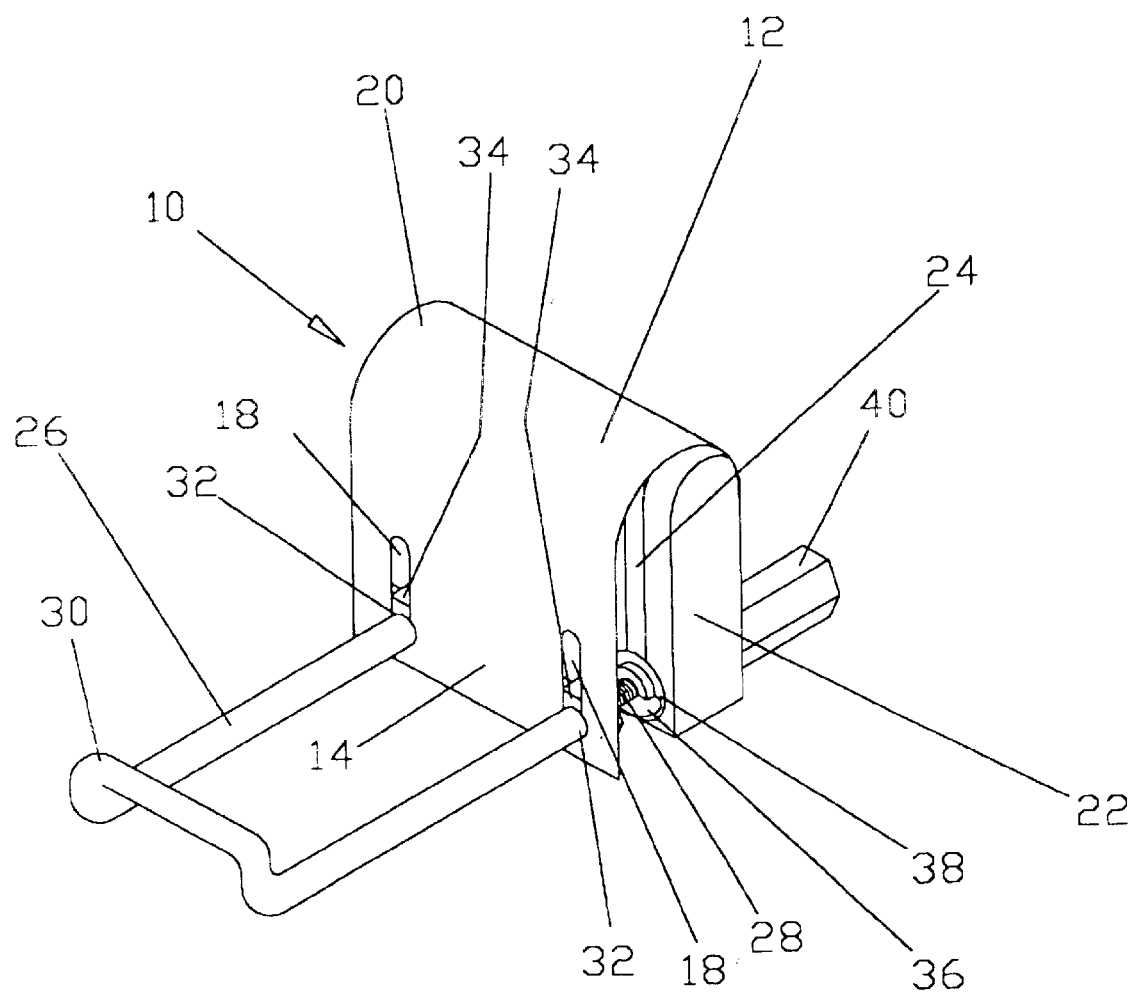
FIG. 1 represents a perspective view of the clamping device for stainless steel sinks assembled in accordance with the principles of the present invention.
Figure 5:
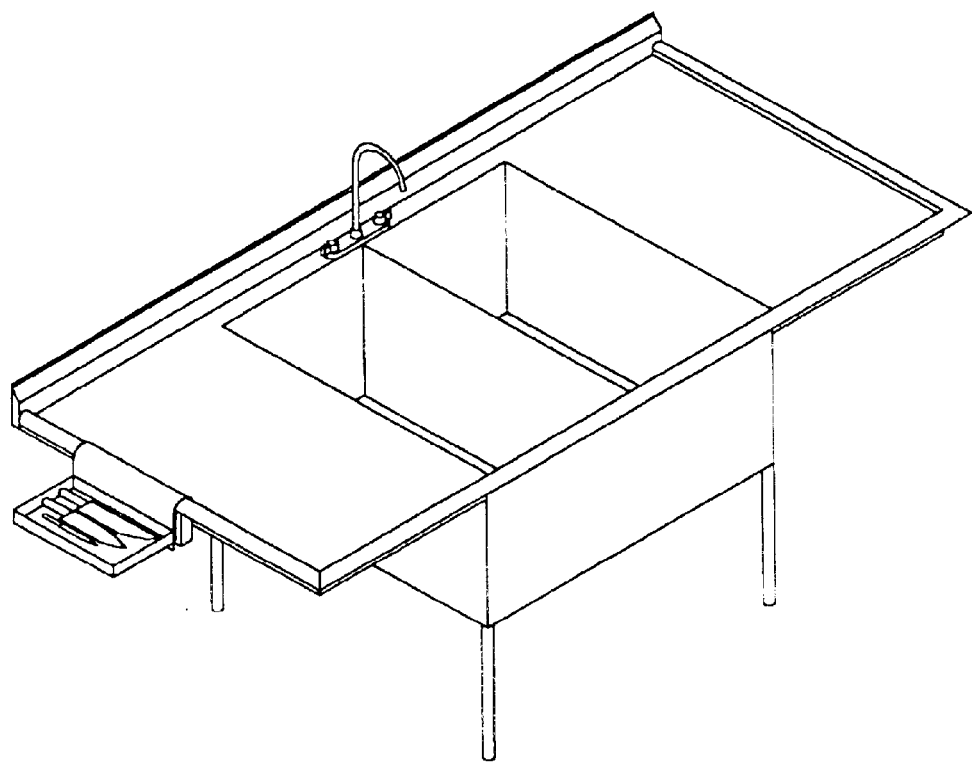
FIG. 5 represents a perspective view of the clamping device of FIG. 3 having a tray added in combination with a rolled rim stainless steel sink.
Figure 6:
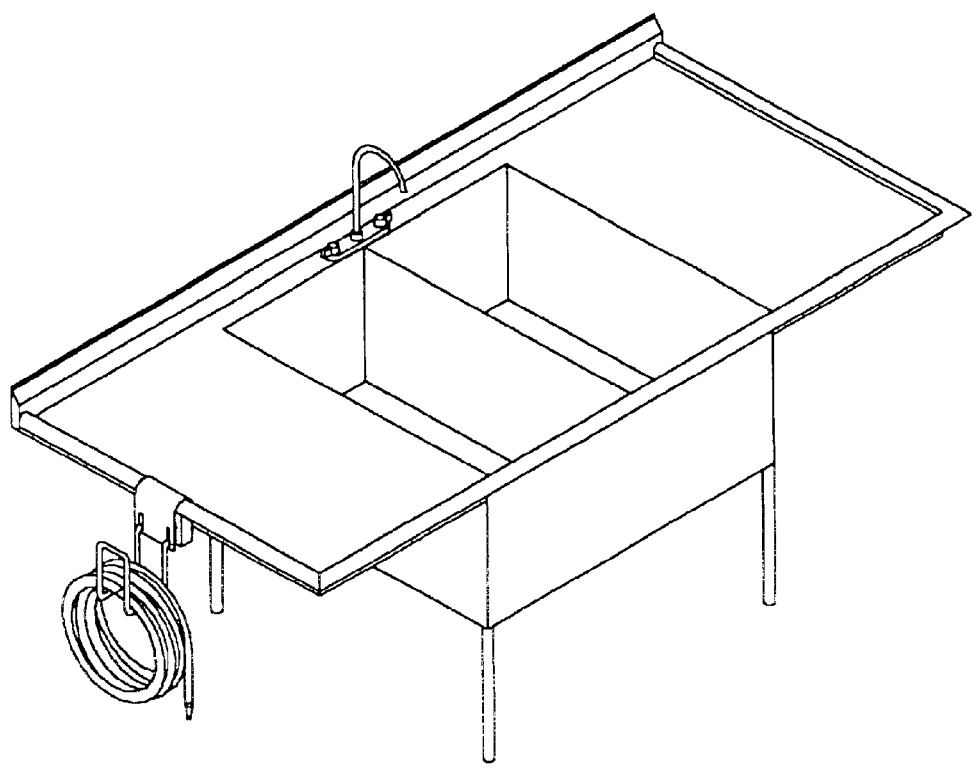
FIG. 6 represents a perspective view of the clamping device of FIG. 2 having a coiled hose added in combination with a rolled rim stainless steel sink.
Figure 8:
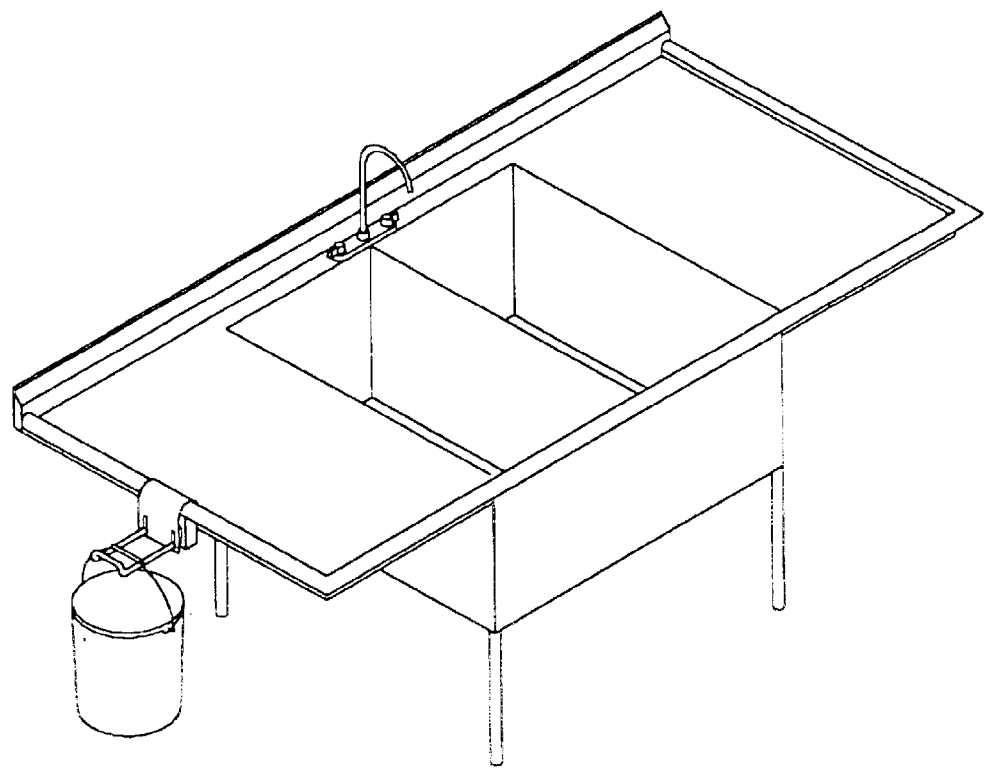
FIG. 8 represents a perspective view of the clamping device of FIG. 1 suspending a pail of chemicals in combination with a rolled rim stainless steel sink.
Figure 9:
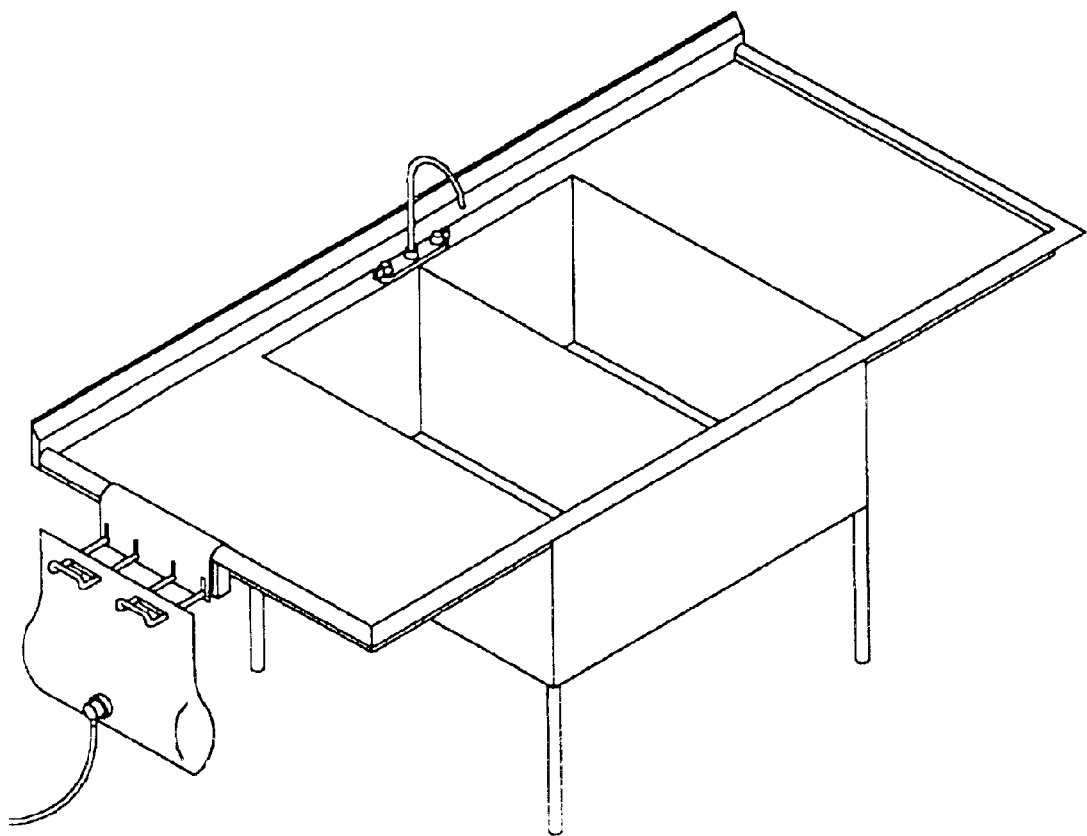
FIG. 9 represents a perspective view of the clamping device of FIG. 3 suspending a polypropylene bag of chemicals.

The supporting member 26 is constructed preferably from steel rods having substantial diameter to withstand any weight suspended from it. In one embodiment, the supporting member 26 has two straight arms connected at one end by an upward facing cross member 30 and opposite thereto a pair of threaded ends 28. If two supporting members 26, as seen in FIG. 3, are used in conjunction with a wider facial plate 12, this design can be used to create a shelf on which to rest a storage bin, as seen in FIG. 5, or as a suspension means for bags of chemicals, as seen in FIG. 9. Additionally, if one supporting member 26, as seen in FIG. 1, is used, this design can be used to suspend containers of chemicals, as seen in FIG. 8. In an alternative embodiment as seen in FIG. 2, the supporting member 26 has two substantially U-shaped arms connected at one end by a cross member 30 with a pair of threaded ends 28 projecting distally. This design creates a saddle on which to support the upper portion of a coiled hose, as seen in FIG. 6. A stepped shoulder 32 is created at the point where the arms of the supporting member 26 meet the threaded ends 28. This prevents the arms from entering the elongated slots 18 when the device 10 is assembled.

Front 34 and rear 36 fastening means and washers 38 are affixed onto the threaded ends 28 of the supporting member 26. Preferably the fastening means are wing nuts because of the ease in which they can be tightened and loosened. Affixed to the terminal ends of the threaded ends 28 are bracing members 40, which aid in countering any downward force placed on the end of the supporting member 26.

To assemble the clamping device 10, as seen in FIG. 2, the threaded ends 28 of the supporting member 26 are inserted into the elongated slots 18 of the front facial plate 14. Front 34 and rear 36 fastening means are screwed clockwise onto the threaded end 28 of each arm followed by two washers 38. The fastening means 34 is substantially tightened until the stepped shoulder 32 of the supporting member 26 rests loosely against the front facial plate 14. A bracing member 40 is affixed to the terminal end of each threaded end 28 of the supporting member 26. In operation the present device 10, as shown by FIG. 4, is clamped to a stainless steel sink having a rolled rim edge 44 such that the crispate top 20 of the facial plate 12 encapsulates the rolled rim edge 44 of the sink. The elongated slots 18, as seen in FIG. 2, allow the supporting member 26 vertical mobility which, as will be apparent, facilitates the positioning of the device 10 over the rolled rim edge 44. As shown by FIG. 4, with the crispate top 20 of the facial plate 12 cupping and resting on the rolled rim edge 44, the supporting member 26 is positioned, leveled, and loosely secured to the point where the bracing members 40 make contact with the sink underside 48. The compression gib 22 is then inserted by sliding it upward such that the grooves 24, as seen in FIG. 2, fit over the threaded ends 28 of the supporting member 26. Once the compression gib 22 is seated beneath the rolled rim edge 44, as depicted in FIG. 4, against the vertical wall 46 and between the washers 38 the rear fastening means 36 is screwed counter-clockwise toward the gib 22 to lock it in position. The front fastening means 34 is then securely tightened clockwise against the backside of the front facial plate 14.

As seen in FIG. 4, a unique feature of the clamp of the present invention is that it is designed to utilize four points of contact to mount the device 10 to a rolled rim sink 42 for suspension of weighted items. One point is the crispate top 20 of the facial plate 12 encapsulating and cupping the rolled rim edge 44 in a hanging manner, to defy gravity. Another is the force exerted by the rear fastening means 36 upon the gib 22 against the vertical wall 46 of the rolled rim sink 42. Another is the point at which the gib 22 takes advantage of the underside of the rolled rim edge 44. The fourth is the bracing members 40 contact with the sink underside 48. All four points act in unison to secure the device 10 and counter weight suspended from the supporting member 26.

The clamping device 10 may also be slid horizontally along the rolled rim edge 44 since the four points of contact secures the device 10 to counter all weight suspended perpendicular to the rolled rim edge 44, while still allowing the device to move horizontally along the rolled rim edge 44.

As should be apparent from the foregoing specification, the invention is susceptible to being modified with various alterations, which may differ from those which have been described in the preceding specification and description. Accordingly, the following claims are intended to cover all alterations and modifications, which do not depart from the spirit of the invention.

What is claimed:

1. A clamping device for stainless steel sinks comprising:
   i. a facial plate having a front with at least one pair of slots and a crispate top connecting said front to a back;
   ii a compression gib inserted between said front and back having elongate grooves having a longitudinal axis disposed perpendicularly to said crispate top which align with said slots of the front facial plate;
   iii. a supporting member having threaded ends which are received by said slots in the facial plate and said grooves in the gib;
   iv. a fastening means affixed on the threaded ends of said supporting member; and
   v. bracing members affixed on terminal ends of said threaded ends of the support member.

2. The clamping device for stainless steel sinks of claim 1, whereby the front of the facial plate has a greater linear extension than the back facial plate.

3. The clamping device for stainless steel sinks of claim 1, whereby the slots of the facial plate are disposed substantially near a bottom and extend upward vertically therefrom.

4. The clamping device for stainless steel sinks of claim 1, whereby the compression gib has a crispate top.

5. The clamping device for stainless steel sinks of claim 1, whereby the supporting member has two arms connected at one end by a cross member and opposite thereto a pair of said threaded ends.

6. The clamping device for stainless steel sinks of claim 1, whereby the width of the facial plate has numerous pairs of elongated slots.

7. The clamping device for stainless steel sinks of claim 6, whereby each pair of the elongated slots receive a supporting member.

8. The clamping device for stainless steel sinks of claim 1, whereby said device is assembled by inserting said threaded ends of said supporting member into said slots of said front facial plate, said fastening means include a front and a rear fastening means each threaded end of said supporting member receives said front and rear fastening means which are screwed clockwise and two washers, said fastening means are tightened until a stepped shoulder of said supporting member rests loosely against said front facial plate.

9. The clamping device for stainless steel sinks of claim 8, whereby the assembled device is attachable to said sink by placing said crispate top of said facial plate over a rolled rim of said sink until said bracing member wakes contact with the underside of said sink, said compression gib is inserted by sliding it upward such that each groove receives a one of the threaded ends of said groove supporting member until said crispate top of said compression gib is adapted to be seated beneath the rolled rim between a vertical wall of said sink and said washer, said rear fastening means is screwed counter clockwise toward said gib and said front fastening means is tightened against the front facial plate.

10. The clamping device for stainless steel sinks of claim 9, whereby said assembled device is repositionable by loosing said rear fastening means and sliding said device horizontally over said rolled rim of said sink and made operational by retightening said rear fastening means.

11. The clamping device for stainless steel sinks of claim 9, whereby said assembled device is mounted to said rolled rim sink by the rear fastening means upon said gib against the vertical wall of said sink, by said gib against the underside of said rolled rim, and by said bracing members contacting with the underside of said sink.

* * * * *